US009065900B2

(12) United States Patent
Lehmann

(10) Patent No.: US 9,065,900 B2
(45) Date of Patent: Jun. 23, 2015

(54) METHOD AND SYSTEM TO SHIELD MOBILE PHONES AND DEVICES TO MINIMIZE RADIATION EXPOSURE

(75) Inventor: Harry V. Lehmann, Novato, CA (US)

(73) Assignee: Green Swan, Inc., Novato, CA (US)

( * ) Notice: Subject to any disclaimer, the term of this patent is extended or adjusted under 35 U.S.C. 154(b) by 500 days.

(21) Appl. No.: 12/979,712

(22) Filed: Dec. 28, 2010

(65) Prior Publication Data

US 2011/0157859 A1    Jun. 30, 2011

Related U.S. Application Data

(63) Continuation-in-part of application No. 12/978,142, filed on Dec. 23, 2010.

(60) Provisional application No. 61/290,492, filed on Dec. 28, 2009, provisional application No. 61/290,493, filed on Dec. 28, 2009, provisional application No. 61/290,854, filed on Dec. 29, 2009.

(51) Int. Cl.
| | |
|---|---|
| *H04M 1/00* | (2006.01) |
| *H04M 1/23* | (2006.01) |
| *H01Q 1/24* | (2006.01) |
| *H01Q 1/52* | (2006.01) |
| *H04B 1/3827* | (2015.01) |

(52) U.S. Cl.
CPC ............... *H04M 1/23* (2013.01); *H01Q 1/245* (2013.01); *H01Q 1/526* (2013.01); *H04B 1/3838* (2013.01)

(58) Field of Classification Search
USPC ............. 455/575.5, 90.3, 117, 128, 300, 347, 455/349
See application file for complete search history.

(56) References Cited

U.S. PATENT DOCUMENTS

| | | | |
|---|---|---|---|
| 5,335,366 A | 8/1994 | Daniels | |
| 5,336,896 A | 8/1994 | Katz | |
| 5,530,919 A * | 6/1996 | Tsuru et al. ................. | 455/575.5 |
| 5,541,609 A | 7/1996 | Stutzman et al. | |
| 5,787,340 A * | 7/1998 | Sepponen ................... | 455/575.5 |
| 6,259,896 B1 * | 7/2001 | Sepponen ................... | 455/575.5 |
| 6,341,217 B1 * | 1/2002 | Wong .......................... | 455/575.5 |
| 6,404,403 B1 | 6/2002 | Kunz et al. | |
| 6,456,856 B1 | 9/2002 | Werling et al. | |
| 6,505,036 B2 | 1/2003 | Zilberberg et al. | |
| 6,615,026 B1 * | 9/2003 | Wong .......................... | 455/575.5 |
| 6,785,519 B2 | 8/2004 | Toyoda et al. | |
| 6,800,420 B2 * | 10/2004 | Song et al. ................. | 430/281.1 |
| 6,934,515 B2 | 8/2005 | Wallach | |
| 7,146,139 B2 | 12/2006 | Nevermann | |

(Continued)

FOREIGN PATENT DOCUMENTS

| | | |
|---|---|---|
| GB | 2327572 A | 1/1999 |
| WO | 2009/130165 A2 | 10/2009 |

*Primary Examiner* — Edward Urban
*Assistant Examiner* — Rui Hu
(74) *Attorney, Agent, or Firm* — Duane Morris LLP

(57) ABSTRACT

A method and system for protecting a user from exposure from radio waves emitted from a wireless transmitter include at least a layer of dielectric material to operate on the radio wave through reflection, refraction, diffraction, absorption, polarization and/or scattering of the wave. The characteristics and arrangement of multiple layers of shielding on portions of or all of a face plate may significantly reduce exposure to electromagnetic waves and the deleterious effects associated with over exposure. The shielding can be applied subsequent to manufacture, during manufacture or incorporated into structures which may form the transmitting device.

2 Claims, 9 Drawing Sheets

(56) References Cited

U.S. PATENT DOCUMENTS

| | | | |
|---|---|---|---|
| 7,499,722 B2 | 3/2009 | McDowell et al. | |
| 8,055,274 B2* | 11/2011 | Kim et al. | 455/456.1 |
| 8,350,451 B2* | 1/2013 | Bright et al. | 313/110 |
| 8,805,272 B2* | 8/2014 | Kawamura | 455/11.1 |
| 2002/0071551 A1 | 6/2002 | Lee | |
| 2006/0097035 A1* | 5/2006 | Castaneda et al. | 235/145 R |
| 2006/0164011 A1* | 7/2006 | Lee et al. | 313/582 |
| 2009/0124294 A1* | 5/2009 | Kim et al. | 455/566 |
| 2009/0125083 A1 | 5/2009 | Maples | |
| 2010/0113111 A1* | 5/2010 | Wong et al. | 455/575.5 |
| 2010/0234081 A1* | 9/2010 | Wong et al. | 455/575.5 |
| 2011/0122596 A1* | 5/2011 | Miyazaki et al. | 361/818 |

* cited by examiner

METHOD AND SYSTEM TO SHIELD MOBILE PHONES AND DEVICES TO MINIMIZE RADIATION EXPOSURE

CROSS REFERENCE

This application is a non-provisional application claiming priority of provisional applications: Application No. 61/290,492 entitled METHOD AND DEVICE FOR RADIO WAVE SHIELDING THROUGH INCORPORATION OF DIELECTRIC MATERIAL WAVE BARRIER IN ELECTRONIC DEVICE filed Dec. 28, 2009; Application No. 61/290,493 entitled METHOD AND DEVICE FOR RADIO WAVE SHIELDING THROUGH INCORPORATION OF A TRANSPARENT, SEMI-TRANSPARENT, OR OPAQUE DIELECTRIC filed Dec. 28, 2009; Application No. 61/290,854 entitled METHOD AND DEVICE FOR RADIO WAVE SHIELDING THROUGH INCORPORATION OF A TRANSPARENT, SEMI-TRANSPARENT, OR OPAQUE OR SOLID DIELECTRIC WAVE BARRIER FOR THE FACEPLATE OF ELECTRONIC COMMUNICATION DEVICES, INCLUDING CELLULAR TELEPHONE, PORTABLE TELEPHONE, AND HANDHELD RADIO AND ENTERTAINMENT DEVICES filed Dec. 29, 2009. The entirety of each referenced provisional application is incorporated herein by reference.

This application also claims priority benefit of non-provisional application Ser. No. 12/978,142 entitled METHOD AND SYSTEM TO MINIMIZE RADIATION EXPOSURE FROM MOBILE PHONES AND DEVICES filed Dec. 23, 2010. The entirety of which is also incorporated herein by reference.

BACKGROUND

The disclosed subject matter is directed to minimizing the exposure to electromagnetic waves and non-ionizing radiation due to use of mobile appliances. This disclosure uses mobile device, mobile appliance, cell phone, cellular phone, wireless phone, wireless device, mobile phone and mobile radio, as well as phone, telephone, cell and radio interchangeably and the use of such terms is not exclusive and is intended to encompass all communication devices and apparatuses that transmit radio waves during communications and are held or located in close proximity to the user.

Microwaves are absorbed by living tissues at 24 times the rate of their absorption by pure water. While the Specific Absorption rate, one standard by which cellular microwave absorption by the body is commonly measured, is typically based upon a penetration through an inert emulation of a human head, competent experimental work indicates that the level of absorption in living tissue is many times greater than the level of microwave absorption through an inert liquid, such as water.

In a 1983 article entitled An Optical Method for Investigating the Microwave Characteristics of DNA and other Biomolecules in Solution, by Mays L. Swicord and Christopher C. Davis, published in the journal Bioelectronmagnetics, experimental results were reported which determined that "A significant increase in the absorption of DNA solutions as compared with pure water has been observed that is consistent with microwave absorption by the longitudinal mode of the double helix". Thus, in their conclusion Swicord and Davis state that: However, the results presented in this work are in good agreement with the Prohofsky model of acoustic mode absorption by varying lengths of DNA. Prohofsky and Van Zandt predicted that 450 to 2000 base pair segments of synthetic DNA should absorb $10^3$ to $10^4$ times as strongly in the microwave region as an equivalent mass of water with a decrease in peak absorption due to water damping. The 1.7% dilution of DNA investigated by PFLOH spectroscopy in this work indicated a 40% increase in absorption above pure water at 8 GHz and at 10 to 12% increase at 12 GHz. The measured DC conductance of this DNA sample was quite low yet its absorption coefficient was still 25% higher at 8 GHz than a saline solution of 20 times greater DC conductance. We conclude therefore that the observed absorption of the DNA solution does not come from ionic behavior.

The observed absorption is suggestive of direct microwave absorption by the longitudinal acoustic mode of the double helix discussed by Prohofsky and co-workers. Based on the concentration of DNA solution which gave 40% more absorption than pure water at 8 GHz, the microwave absorption of DNA at this frequency is 24 times greater than an equivalent mass of water.

This finding that there are many orders of magnitude of increase in microwave absorption when DNA is present, may likely explain the considerable body of experimental evidence strongly indicating a relationship between long term mobile device use, and diseases involving DNA strand abnormality, such as brain cancer.

Scientific [i.e, H. Lai et al, from the University of Washington, 1984, 1988, and as presented in 1998, Vienna, Austria, and 2009 in Stavanger, Norway; O. Johansson, Associate Professor, Dept. of Neuroscience of the Karolinska Institute, Stockholm, and Professor, Royal Institute of Technology, Stockholm, as presented in 2009 at Stavanger, Norway; Carl F. Blackman a founder of the Bioelectromagnetics Society, as presented in 2009, at Stavanger, Norway; Martin Blank, Ph.D., Associate Professor, Columbia University, as presented in 2009 Stavanger, Norway, Franz Adlkofer, M. D., doctorate from the Max Planck Institute for Biochemistry as presented at Stavanger Norway, 2009, also the following presenters at the International EMF Conference 2009 at Stavanger, Norway: Lukas h. Margaritis, Ph.D., Greece; Elihu D. Richter, M D, M.P.H., Israel; Alvaro Agusto A. de Salles, Ph.D., Brazil; Fredrik Soderqvist, Ph.D., Sweden, Yuri G. Grigoriev M.D. Sci., Russia; Anton V. Merkulov Ph.D., Russia] studies have shown potential health risks, in some instances showing DNA breakage, as associated with human exposure to non-ionizing radio wave sources, including but not limited to those emitted from mobile telephone devices and handsets, including but not limited to cellular telephones, satellite telephones, cordless telephones, and also portable computers, including those equipped with wi fi connectivity capacity. Continuing research supports that such health risks as may be associated with proximity to non-ionizing radiation will be reduced if level of exposure is reduced.

As used here, the term "non-ionizing radiation," is in reference to types and frequencies of radiation which do not have the capacity to force electron shifting at an atomic level, including with molecular effect. As used here, the term "ionizing radiation" is in reference to types and frequencies of radiation which do have the capacity to force electron shifting at an atomic level, including with molecular effect.

Current electromagnetic field generating communication devices allow the transmission of electromagnetic field though the human head, and are typically held in direct contact with the head of the user. While the SAR standards currently viewed as "safe," by the FCC rely upon an assumption that the device involved is held at an inch from the head of the user, the practical experience of the typical end user is to hold the device in direct contact with the ear. Microwave devices, including variants of mobile and portable telephone devices broadcast electromagnetic waves, including but not limited to the radio waves which serve as conduit for the transmission of information, by modulation of amperage or frequency or varying combinations thereof. As discussed above there is competent scientific data indicating that information carrying microwave broadcast near the human body will result in DNA damage and can result in the formation of cancers. In addition, other data indicates that cellular device users with smaller skulls may receive a microwave dosage in inverse relationship to relative skull size, and that, further, the shape of the interior of the skull, including as to concavity, may have a focusing effect, potentially resulting in "hot spots" of electromagnetic signal absorption.

Current electromagnetic field generating communication devices, allow the transmission of electromagnetic fields through all or most quadrants of the devices involved, and specifically through the keys of such devices, which devices are, in common usage, often held near the head of the user. Current such devices, broadcast electromagnetic waves, including but not limited to the radio waves which serve as conduit for information carrying by modulation of amperage or frequency or varying combinations thereof, through the keys of such devices. By the term "keys," reference is made to the actuation keys of such devices as used for telephone dialing, Internet acquisition dialing, text messaging, computation, and, in short, each and all tasks which are accomplished by the users of such portable devices, and also other devices of variable portability, including but not limited to portable and stationary computers, including those with "wireless," or "wi fi," capacity, all of which use keys on a keypad for the insertion of data into the device involved.

It is an object of the disclosed subject matter to reduce human user electromagnetic wave exposure from such devices through the insertion of a dielectric layer in each of the keys of the keypad of such devices with insertion of such dialectic layer has a wave reflective, and therefore wave insulating characteristic, thereby working to protect the end user of such equipment from the extent of radio wave exposure to which such end user(s) would be exposed if such dielectric barrier layer was not integrated into the keys of such devices. These dielectric layers once installed upon and within the keys of such devices, and by their compositional nature having a wave exposure insulating or reducing effect would reduce the level of exposure of the end user to radio waves generated by the devices as described in this Application.

These and many other advantages of the present subject matter will be readily apparent to one skilled in the art to which the invention pertains from a perusal of the claims, the appended drawings, and the following detailed description of preferred embodiments.

DETAILED DESCRIPTION

Embodiments of devices and methods described herein reduce end user exposure to radiation. While these devices and methods are intended for protection from non-ionizing radiation, such as that emitted from cellular telephones, each embodiment and illustration may also be practiced with regard to ionizing radiation.

Figure 1:
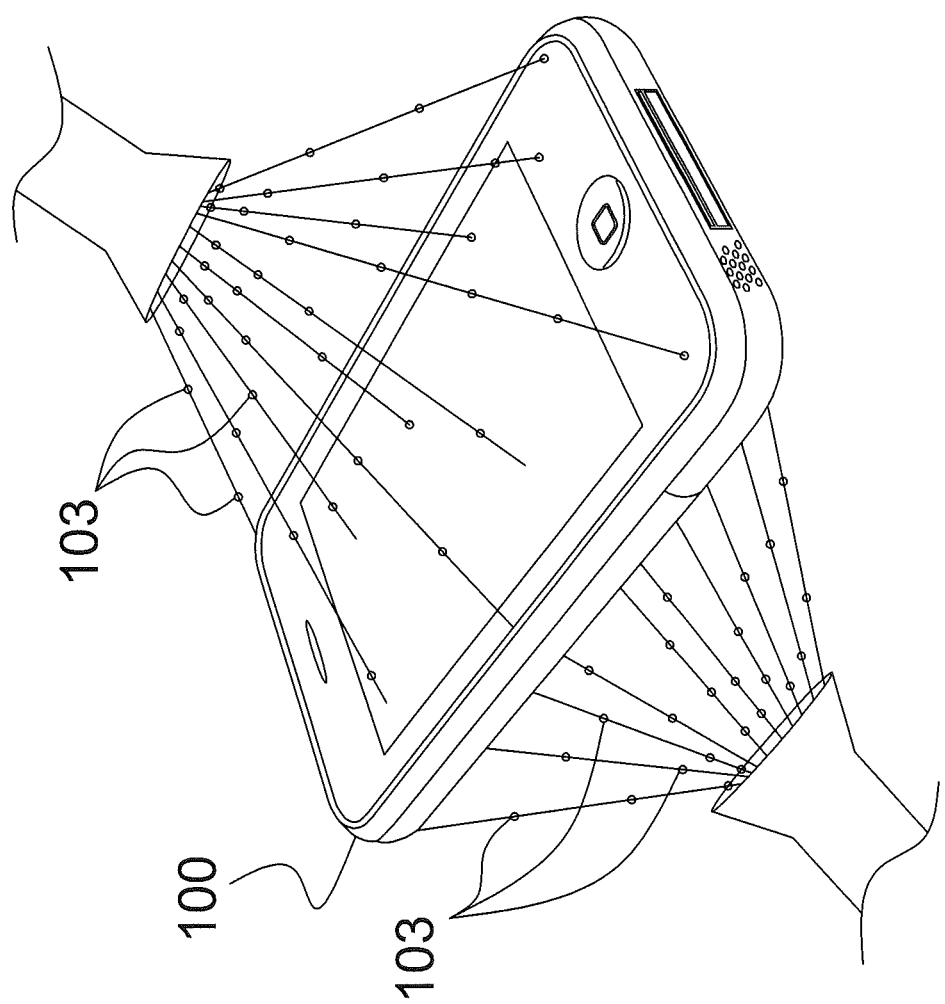
FIG. 1 is an illustration of an application of a dielectric material according to an embodiment of the disclosed subject matter.

FIG. 1 shows the spray on application of dielectric nanospheres 103 and other wave interfering spheres such as ferrite. The dielectric coating is shown as covering the faceplate of the mobile device 100 which includes the screen and/or the key pad. In addition, portions of the back plate that do not interfere with broadcast and reception of communication signals may also be coated with a dielectric material. The dielectric material/layer or coating serving to operating on radio waves through reflection, refraction, diffraction, absorption, polarization and/or scattering.

Figure 2:
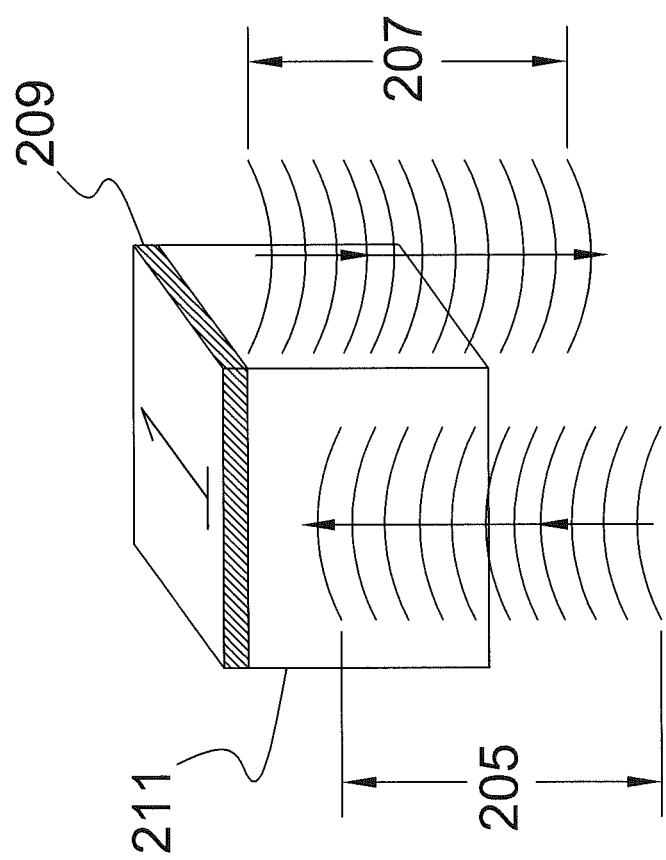
FIG. 2 is an illustration of a dielectric layer at the top of the key of a mobile device according to an embodiment of the disclosed subject matter.

FIG. 2 shows the installation of the dielectric layer 209 at the top of each key 211. The dielectric layer 209 may be selected from the dielectric materials listed in the Listing of Dielectric Materials of table 1, however this as stated later herein, and specifically including ferrite bead, ferrite microbead, and ferrite nano-bead, protects the end user of key-equipped radio frequency generating devices, from the negative health effects of exposure to such radio frequencies, including but not limited to the negative health effects of increased Free Radical Production and DNA Strand Breakage, as noted by Lai, above, and others. As shown in FIG. 2 radio waves 205 emanating from the mobile device are reflected back as reflected wave 207.

Figure 3:
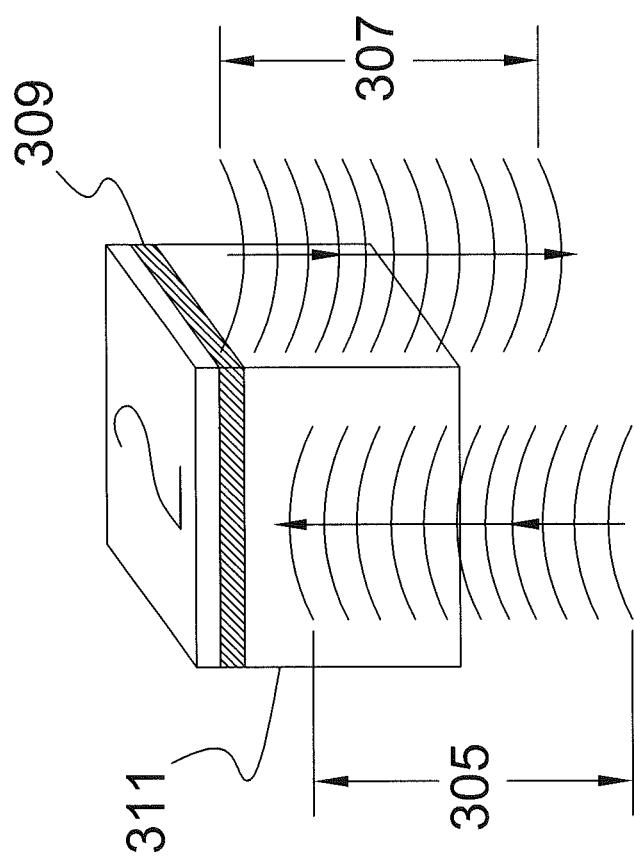
FIG. 3 is an illustration of a dielectric layer inside and below the surface of each key according to another embodiment of the disclosed subject matter.

FIG. 3 hereto shows the installation of the dielectric layer 309 inside and below the surface of each key 311. The dielectric material layer 309 protects the end user of key-equipped radio frequency generating devices, from the negative health effects of exposure to such radio frequencies. Radio wave 305 is shown as being reflected as wave 307.

Figure 4:
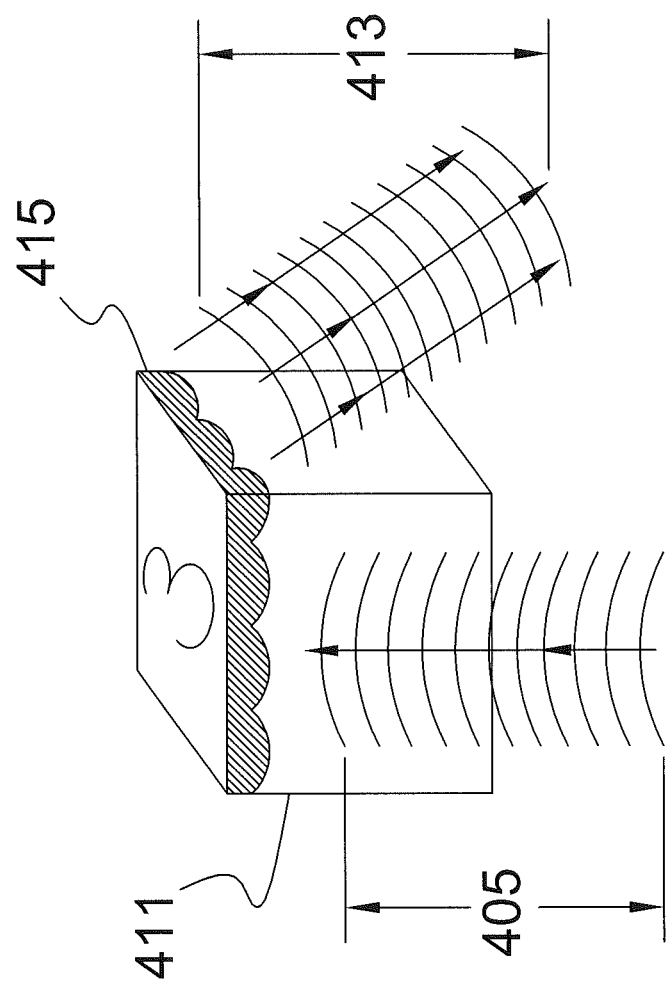
FIG. 4 is an illustration of dielectric layer in a convex shape, relative to the wave source, on top of the key of a mobile device according to embodiments of the disclosed subject matter.

FIG. 4 hereto shows the installation of the dielectric layer 415 in a convex shape, relative to the wave source, on top of the key 411. As a result of the convex shape, wave 405 is diffused and reflected back as wave 413. This embodiment further protects the end user from the effects of the subject radio frequencies through propagating interference patterns in said radio waves in their reflected state, with an increase in such localized interference being achieved through the increased interference resultant from increased signal crossing due to the dielectric's shape. Shapes of the dielectric layer may be oriented while the layer involved is in a liquid, semi-liquid, or malleable plastic state through magnetic tagging of nano-particles of such shapes as integrated into the applied medium and influenced in cured orientation through the application of magnetic field during the curing process.

Figure 5:
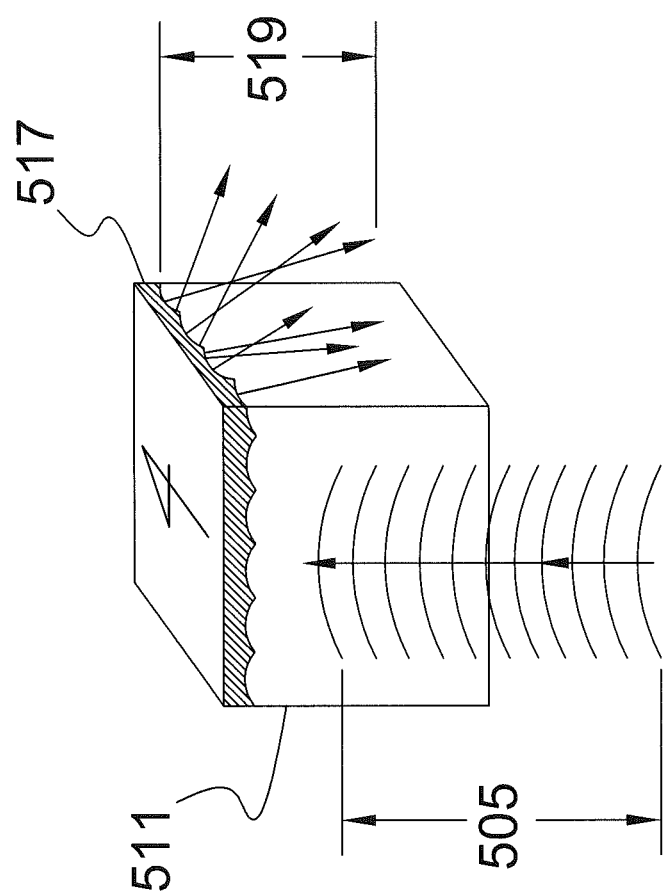
FIG. 5 is an illustration of a dielectric layer in a concave shape, relative to the wave source, on top of the key of a mobile device according to embodiments of the disclosed subject matter.

FIG. 5 hereto shows the installation of the dielectric layer 517 on top of the key 511 in a concave shape, relative to the wave source. Additionally its concave shape further protects the end user from the effects of the radio waves 505 through propagating interference patterns of said radio waves in their reflected state 519, with an increase in such localized interference being achieved through the increased interference resultant from increased signal crossing due to such shape. It is additionally noted that such shapes may be oriented while the layer involved is in a liquid, semi-liquid, or malleable plastic state through magnetic tagging of nano-particles of such shapes as integrated into the applied medium and influenced in cured orientation through the application of magnetic field during the curing process.

Figure 6:
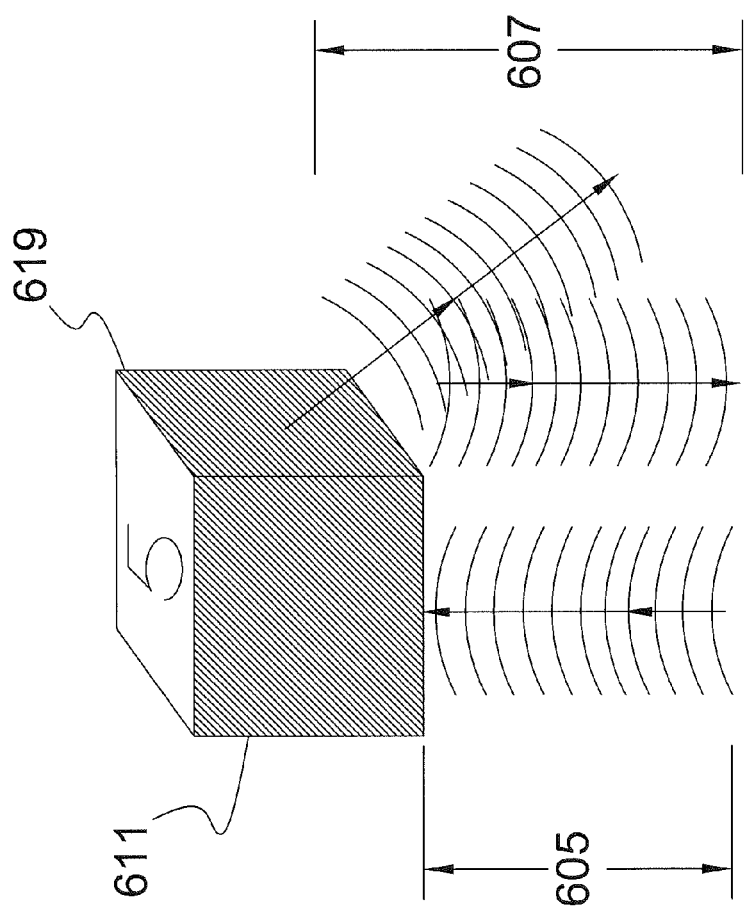
FIG. 6 is an illustration of a key of a mobile device composed substantially of a dielectric material according to embodiments of the disclosed subject matter.

FIG. 6 hereto shows a key 611 entirely composed of dielectric material 619, having by its inherent composition a wave reflective and dampening effect. The wave 605 is both attenuated and reflected as illustrated by reflected waves 607.

Figure 7:
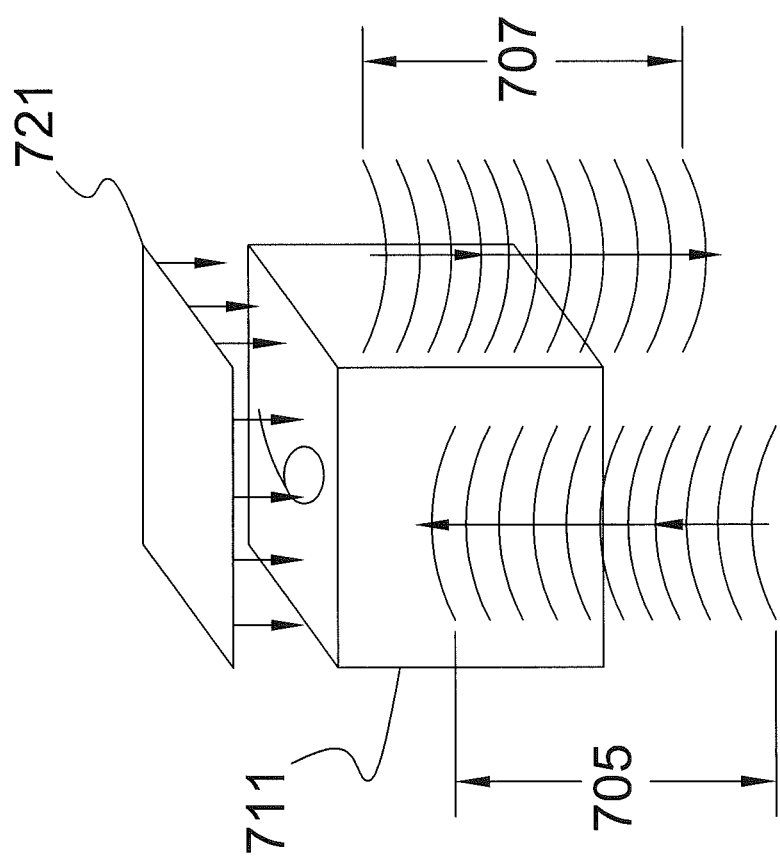
FIG. 7 is an illustration of a key to which a transparent dielectric material is applied according to embodiments of the disclosed subject matter.

FIG. 7 hereto shows a key 711 to which transparent dielectric material 721 has been adhesively applied, or applied by other means of bonding, including but not limited to non-pb transparent dielectric materials such as Bi2O2-B2O3-BaO—Zno, such as described by Joon-Young Song and Se-Young Choi, of the School of New Materials Science and Engineering, Yonsei University, Seoul 120-749, South Korea, in their 2005, 2006 paper Fabrication and characterization of Pb-free transparent dielectric layer for plasma display panel, so has to have a wave reflective, and therefore from the perspective of the user, wave dampening effect, as to radiation which would otherwise pass through the keys into the body of the human end user. The wave 705 and the reflected wave 707 as a result of the transparent dielectric layer 721 is shown in FIG. 7.

Figure 8:
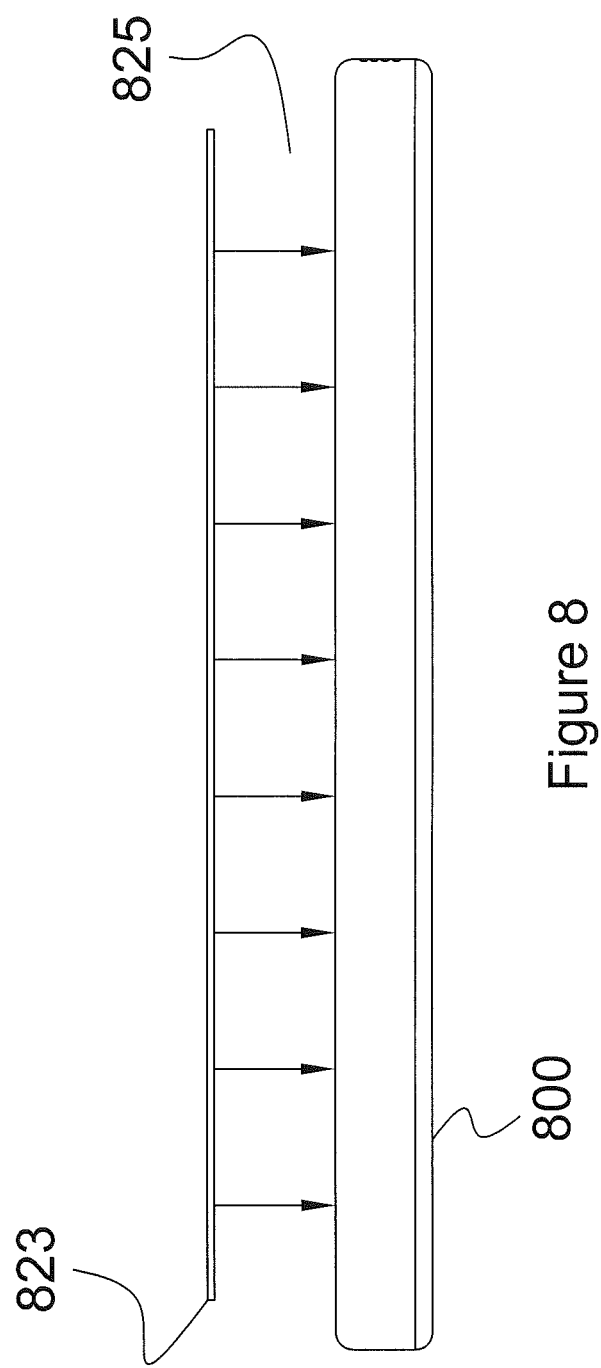
FIG. 8 is an illustration of a transparent dielectric sheet placed over the face plate of a mobile device according to embodiments of the disclosed subject matter.

FIG. 8 shows a transparent dielectric sheet 823 placed over the face plate of a mobile device 800. The transparent, translucent, or semi-transparent dielectric sheet 823 may be adhesively applied, or applied by other means of bonding, including but not limited to non-pb transparent dielectric materials such as Bi2O2-B2O3-BaO—Zno, such as described above, so as to have a wave reflective, and therefore from the perspective of the user, wave dampening effect, as to radiation which would otherwise pass through the screen of the device into the body of the human end user. Any transparent dielectric material which may be so bonded, including by sheet, spray, weld, powder coat, or epoxy or other cure method to the device is contemplated.

Figure 9:
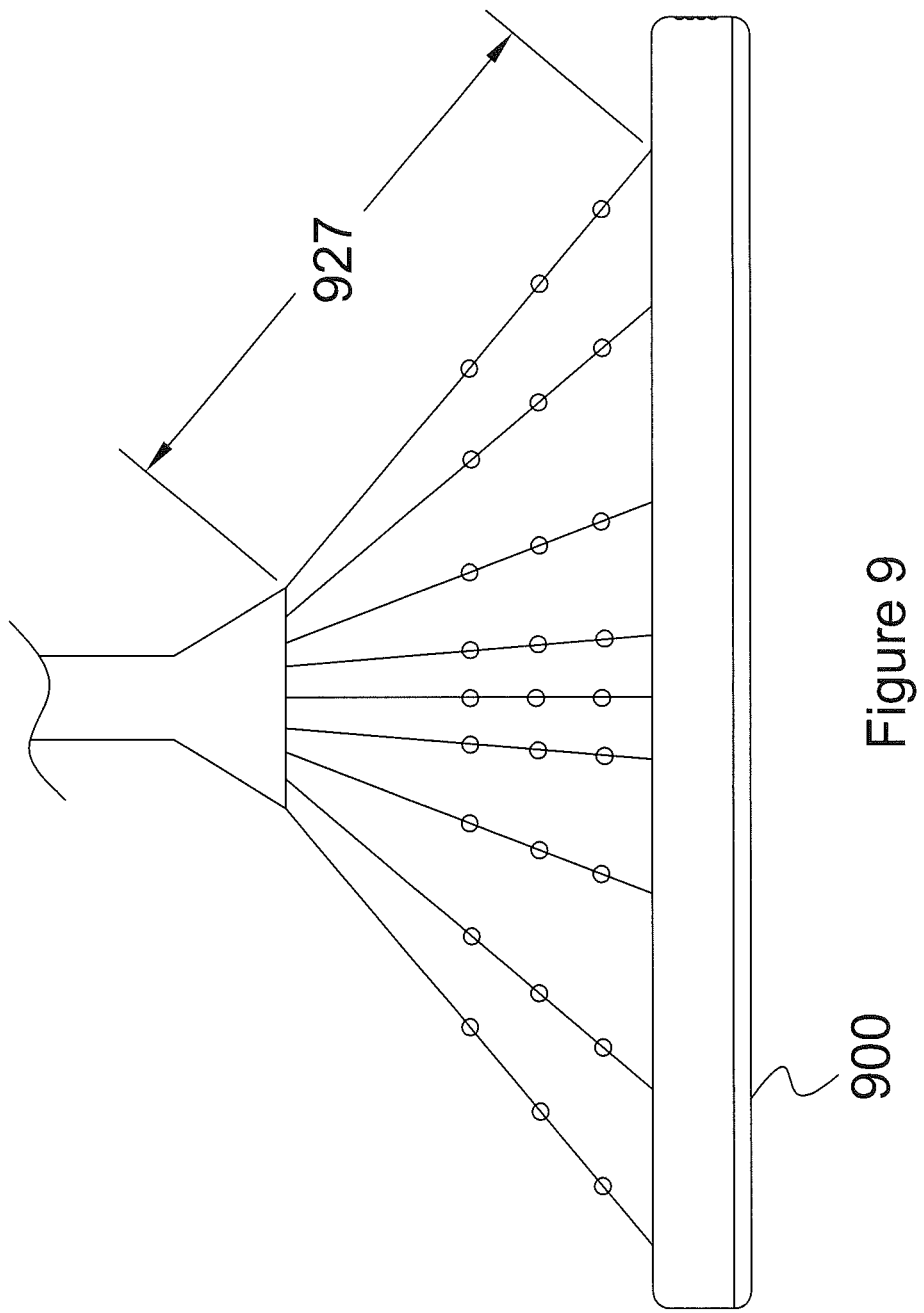
FIG. 9 is an illustration of the application of a translucent dielectric material of a carrier and suspended dielectric nanospheres to a screen of a mobile device according to an embodiment of the disclosed subject matter.

FIG. 9 hereto shows a screen of a mobile device 900, to which translucent dielectric material 927, composed of a carrier and suspended dielectric nano-spheres have been adhesively applied, or applied by other means of bonding, including but not limited to non-pb transparent dielectric materials such as $B_{12}O_2$—$B_2O_3$—BaO—Zno, such as described by Joon-Young Song and Se-Young Choi, and, as to such spheres, including ferrite nano-spheres, so as to have a wave reflective nature, and therefore from the perspective of the user, wave dampening effect, as to radiation which would otherwise pass through the screen of the device into the body of the human end user.

An aspect of the disclosed subject matter includes arranging layers of materials and interfaces to shield the user from radio waves. Dielectric layers may be alternated with different dielectric layers, layers of different refractive indices or layers of different materials. Additionally in keys or coatings with multiple interfaces, each interface may define the same or different shapes to work independently or cooperatively.

Another aspect of the disclosed subject matter is the use of transparent, translucent or semi-translucent dielectric material to allow for shielding of screens and other parts where opaque coatings would deleteriously affect functionality.

Dielectric material suitable for use in the disclosed subject matter may include but are not limited to those listed in Table 1.

TABLE 1

(Dielectric Materials)

ABS Resin, Lump 2.4-4.1
ABS Resin, Pellet 1.5-2.5
Acenaphthene (70☐ F.) 3.0
Acetal (70° F.) 3.6
Acetal Bromide 16.5
Acetal Doxime (68☐ F.) 3.4
Acetaldehyde (41☐ F.) 21.8
Acetamide (68☐ F.) 41
Acetamide (180☐ F.) 59.0
Acetanilide (71☐ F.) 2.9
Acetic Acid (68☐ F.) 6.2
Acetic Acid (36☐ F.) 4.1
Acetic Anhydride (66☐ F.) 21.0
Acetone (77☐ F.) 20.7
Acetone (127☐ F.) 17.7
Acetone (32☐ F.) 1.0159
Acetonitrile (70☐ F.) 37.5
Acetophenone (75° F.) 17.3
Acetoxime (24☐ F.) 3
Acetyl Acetone (68☐ F.) 23.1
Acetyl Bromide (68☐ F.) 16.5
Acetyl Chloride (68° F.) 15.8
Acetyl Acetone (68☐ F.) 25.0
Acetylene (32☐ F.) 1.0217
Acetylmethyl Hexyl Ketone (66° F.) 27.9
Acrylic Resin 2.7-4.5
Acteal 21.0-3.6
Air 1
Air (Dry) (68☐ F.) 1.000536
Alcohol, Industrial 16-31
Alkyd Resin 3.5-5
Allyl Alcohol (58☐ F.) 22.0
Allyl Bromide (66☐ F.) 7.0
Allyl Chloride (68☐ F.) 8.2
Allyl Iodide (66° F.) 6.1
Allyl Isothiocyanate (64☐ F.) 17.2
Allyl Resin (Cast) 3.6-4.5
Alumina 9-3-11.5
Alumina 4.5
Alumina China 3.1-3.9
Aluminum Bromide (212☐ F.) 3.4
Aluminum Fluoride 2.2
Aluminum Hydroxide 2.2
Aluminum Oleate (63☐ F.) 2.4
Aluminum Phosphate 6.0
Aluminum Powder 1.6-1.8
Amber 2.8-2.9
Aminoalkyd Resin 3.9-4.2
Ammonia (−74☐ F.) 25
Ammonia (−30☐ F.) 22.0
Ammonia (40☐ F.) 18.9
Ammonia (69☐ F.) 16.5
Ammonia (Gas?) (32° F.) .0072
Ammonium Bromide 7.2
Ammonium Chloride 7.0
Amyl Acetate (68☐ F.) 5.0
Amyl Alcohol (−180☐ F.) 35.5
Amyl Alcohol (68☐ F.) 15.8
Amyl Alcohol (140☐ F.) 11.2
Amyl Benzoate (68° F.) 5.1
Amyl Bromide (50☐ F.) 6.3
Amyl Chloride (52☐ F.) 6.6
Amyl Ether (60☐ F.) 3.1
Amyl Formate (66° F.) 5.7
Amyl Iodide (62☐ F.) 6.9
Amyl Nitrate (62☐ F.) 9.1
Amyl Thiocyanate (68☐ F.) 17.4
Amylamine (72° F.) 4.6

TABLE 1-continued

(Dielectric Materials)

Amylene (70° F.) 2.0
Amylene Bromide (58° F.) 5.6
Amylenetetracarboxylate (66° F.) 4.4
Amylmercaptan (68° F.) 4.7
Aniline (32° F.) 7.8
Aniline (68° F.) 7.3
Aniline (212° F.) 5.5
Aniline Formaldehyde Resin 3.5-3.6
Aniline Resin 3.4-3.8
Anisaldehyde (68° F.) 15.8
Anisaldoxine (145° F.) 9.2
Anisole (68° F.) 4.3
Anitmony Trichloride 5.3
Antimony Pentachloride (68° F.) 3.2
Antimony Tribromide (212° F.) 20.9
Antimony Trichloride (166° F.) 33.0
Antimony Trichloride 5.3
Antimony Tricodide (347° F.) 13.9
Apatite 7.4
Argon (−376° F.) 1.5
Argra (68° F.) 1.000513
Arsenic Tribromide (98° F.) 9.0
Arsenic Trichloride (150° F.) 7.0
Arsenic Trichloride (70° F.) 12.4
Arsenic Triiodide (302° F.) 7.0
Arsine (−148° F.) 2.5
Asbestos 3.0-4.8
Ash (Fly) 1.7-2.0
Asphalt (75° F.) 2.6
Asphalt, Liquid 2.5-3.2
Azoxyanisole (122° F.) 2.3
Azoxybenzene (104° F.) 5.1
Azoxyphenitole (302° F.) 6.8
Return to top
B Bakelite 3.5-5.0
Ballast 5.4-5.6
Ballmill Feed (Cement) 4.5
Balm, Refuse 3.1
Barium Chloride 9.4
Barium Chloride (Anbyd) 11.0
Barium Chloride (2h20) 9.4
Barium Nitrate 5.8
Barium Sulfate (60 F.) 11.4
Barley Flour 3.0-4.0
Barley Powder 3.0-4.0
Beeswax 2.7-3.0
Benzal Chloride (68 F.) 6.9
Benzaldehyde (68 F.) 17.8
Benzaldoxime (68° F.) 3.8
Benzene (68 F.) 2.3
Benzene (275° F.) 2.1
Benzene (700° F.) 1.0028
Benzil (202 F.) 13.0
Benzonitrile (68 F.) 26.0
Benzophenone (122 F.) 11.4
Benzophenone (68 F.) 13.0
Benzotrichloride (68° F.) 7.4
Benzoyl Chloride (70 F.) 22.1
Benzoyl Chloride (32 F.) 23.0
Benzoylacetone (68 F.) 29.0
Benzyl Acetate (70 F.) 5.0
Benzyl Alcohol (68° F.) 13.0
Benzyl Benzoate (68 F.) 4.8
Benzyl Chloride (68 F.) 6.4
Benzyl Cyanide (68 F.) 18.3
Benzyl Cyanide (155 F.) 6.0
Benzyl Salicylate (68 F.) 4.1
Benzylamine (68° F.) 4.6
Benzylethylamine (68 F.) 4.3
Benzylmethylamine (67 F.) 4.4
Beryl 6.0
Biphenyl 20
Biwax 2.5
Bleaching Powder 4.5
Bone Black 5.0-6.0
Bornyl Acetate (70 F.) 4.6

Boron Bromide (32 F.) 2.6
Boronyl Chloride (202 F.) 5.2
Bromaceytal Bromide 12.6
Bromal (70° F.) 7.6
Bromine (68 F.) 3.1
Bromine (32 F.) 1.0128
Bromo-2-Ethoxypentane (76 F.) 6.5
Bromoacetyl Bromide (68 F.) 12.6
Bromoaniline (68 F.) 13
Bromoanisole (86 F.) 7.1
Bromobenzene (68° F.) 5.4
Bromobutylene (68 F.) 5.8
Bromobutyric Acid (68° F.) 7.2
Bromoctadecane 3.53
Bromodecane (76 F.) 4.4
Bromodeodecane (76 F.) 4.1
Bromodocosane (130 F.) 3.1
Bromodoeoane (75 F.) 4.07
Bromoform (68° F.) 4.4
Bromoheptane (76 F.) 5.3
Bromohexadecane (76 F.) 3.7
Bromohexane (76° F.) 5.8
Bromoisovalerio Acid (68 F.) 6.5
Bromomethane (32 F.) 9.8
Bromonapthalene (66 F.) 5.1
Bromooctadecane (86 F.) 3.5
Bromopentadecane (68 F.) 3.9
Bromophropionic Acid (68 F.) 11.0
Bromotoluene (68 F.) 5.1
Bromotridecane (50° F.) 4.2
Bromoundecane (15 F.) 4.7
Bronyl Chloride (94 F.) 5.21
Butane (30° F.) 1.4
Butanol (1) (68 F.) 17.8
Butanone (68 F.) 18.9
Butycic Anhydride (20 F.) 12.0
Butyl Chloral (64 F.) 10.0
Butyl Chloride (68 F.) 9.6
Butyl Oleate (77 F.) 4.0
Butyl Stearate (80 F.) 3.1
Butylacetate (66 F.) 5.1
Butylamine (70 F.) 5.4
Butyraldehyde (79 F.) 13.4
Butyric Acid (68° F.) 3.0
Butyric Anhydride (68 F.) 12.0
Butyronitrile (70 F.) 20.7
Return to top
C Cable Oil (80 F.) 2.2
Cabondioxide (68 F.) 1.000921
Calcim Fluoride 7.4
Caloite 8.0
Calcium 3.0
Calcium Carbonate 6.1-9.1
Calcium Fluoride 7.4
Calcium Oxide, Granule 11.8
Calcium Sulfate 5.6
Calcium Sulfate (H2o) 5.6
Calcium Superphosphate 14-15
Camphanedione (398 F.) 16.0
Camphene (68 F.) 2.7
Camphene (104 F.) 2.3
Camphor, Crystal 10-11
Camphoric Imide 4 (80 F.) 5.5
Camphorpinacone (68 F.) 3.6
Caprilic Acid (18° F.) 3.2
Caproic Acid (160 F.) 2.6
Caprolactam Monomer 1.7-1.9
Caprylic Acid (65 F.) 3.2
Carbide 5.8-7.0
Carbide, Powder 5.8-7.0
Carbon Black 2.5-3.0
Carbon Dioxide (32 F.) 1.6
Carbon Dioxide, Liquid 1.6
Carbon Disulfide, Liquid 2.6
Carbon Disulphide (68 F.) 2.6
Carbon Disulphide (180 F.) 2.2

TABLE 1-continued

(Dielectric Materials)

Carbon Tetrachloride (68° F.) 2.2
Carnauba Wax 2.9
Carvenone (68° F.) 18.4
Carvol (64° F.) 11.2
Carvone (71° F.) 11.0
Cascin 6.1-6.8
Casein Resin 6.7
Cassiterite 23.4
Castor Oil (60° F.) 4.7
Castor Oil (80° F.) 2.6
Castor Oil (Hydrogenated) (80° F.) 10.3
Cedrene (76° F.) 3.2
Cellophane 3.2-6.4
Celluloid 3.3-11
Cellulose 3.2-7.5
Cellulose Acetate 3.2-7
Cellulose Acetate (Molding) 3.2-7.0
Cellulose Acetate (Sheet) 4.0-5.5
Cellulose Acetate Butyrate 3.2-6.2
Cellulose Nitrate (Proxylin) 6.4
Cement 1.5-2.1
Cement (Plain) 1.5-2.1
Cement, Portland 2.5-2.6
Cement, Powder 5-10
Cereals (Dry) 3.0-5.0
Cerese Wax 2.4
Cesium Iodine 5.6
Cetyl Iodide (68° F.) 3.3
Charcoal 1.2-1.81
Chinaware, Hard 4-7
Chloracetic Acid (140° F.) 12.3
Chloracetone 29.8
Chloral (68° F.) 4.9
Chlorhexanone Oxime 3
Chlorine (−50° F.) 2.1
Chlorine (32° F.) 2.0
Chlorine (142° F.) 1.5
Chlorine, Liquid 2
Chloroacetic Acid (68° F.) 21.0
Chloroacetone (68° F.) 29.8
Chlorobenzene (77° F.) 5.6
Chlorobenzene (100° F.) 4.7
Chlorobenzene (230° F.) 4.1
Chlorobenzine, Liquid 5.5-6.3
Chlorocyclohexane (76° F.) 7.6
Chloroform (32° F.) 5.5
Chloroform (68° F.) 4.8
Chloroform (212° F.) 3.7
Chloroheptane (71° F.) 5.5
Chlorohexanone Oxime (192° F.) 3.0
Chlorohydrate (68° F.) 3.3
Chloromethane 4 12.6
Chloronaphthalene (76° F.) 5.0
Chloroocrane (76° F.) 5.1
Chlorophetane 5.4
Chlorotoluene (68° F.) 4.7
Chlorotoluene, Liquid 4-4.5
Cholesterin 2.86
Cholestral (80° F.) 2.9
Chorine (170° F.) 1.7
Chrome, Ore 7.7-8.0
Chrome, Pure 12
Chromite 4.0-4.2
Chromyl Choride (68° F.) 2.6
Cinnamaldehyde (75° F.) 16.9
Cis-3-Hexene (76° F.) 2.1
Citraconic Anhydride (68° F.) 40.3
Citraconic Nitrile 27
Clay 1.8-2.8
Clinker (Cement) 2.7
Coal Tar 2.0-3.0
Coal, Powder, Fine 2-4
Cocaine (68° F.) 3.1
Coffee Refuse 2.4-2.6
Coke 1.1-2.2
Compound 3.6
Copper Catalyst 6.0-6.2
Copper Oleate (68° F.) 2.8
Copper Oxide 18.1
Corderite 2.5-5.4
Corn 5-10
Corn (Dry Granulars) 1.8
Corn, Refuse 2.3-2.6
Corning Glass 6.5
Cotton 1.3-1.4
Cotton Seed Oil 3.1
Co2 (32° F.) 1.6
Creosol (53° F.) 10.6
Cresol (75° F.) 5.0
Cresol, Liquid 9-11
Crotonic Nitrice (68° F.) 28.0
Crystale 3.5-4.7
Curnaldehyde (59° F.) 11.0
Curnene (68° F.) 2.4
Curnicaldehyde (58° F.) 10.7
Cupric Oleate 2.8
Cupric Oxide (60° F.) 18.1
Cupric Sulfate 10.3
Cupric Sulfate (Anhyd) 10.3
Cupric Sulfate (5h2o) 7.8
Cyanoacetic Acid (40° F.) 33.0
Cyanoethyl Acetate (68° F.) 19.3
Cyanogen (73° F.) 2.6
Cyclohedane (20° F.) 2.0
Cyclohenanone (68° F.) 18.2
Cycloheptasiloxane (68° F.) 2.7
Cyclohexane (68° F.) 2.0
Cyclohexane, Liquid 18.5
Cyclohexanecarboxylic Acid (88° F.) 2.6
Cyclohexanemethanol (140° F.) 9.7
Cyclohexanol (77° F.) 15.0
Cyclohexanone (68° F.) 18.2
Cyclohexanone Oxime (192° F.) 3.0
Cyclohexene (68° F.) 18.3
Cyclohexylamine-5 5.3
Cyclohexylphenol (130° F.)
4.0 Cyclohexyltrifluoromethane-1 (68° F.) 11.0
Cyclopentane (68° F.) 2.0
Cymene 62 2.3
Return to top
D D-Cocaine 3.1
D.M.T. (Dacron Powder) 1.33
Decahydronaphtolene (68° F.) 2.2
Decamethylcyclopentasiloxane (68° F.) 2.5
Decamethyltetrasiloxane (68° F.) 2.4
Decanal 8.1
Decane (68° F.) 2.0
Decanol (68° F.) 8.1
Decylene (62° F.) 2.7
Decyne (68° F.) 2.2
Deuterium (68° F.) 1.3
Deuterium Oxide (77° F.) 78.3
Dextrin 2.2-2.4
Diacetoxybutane (76° F.) 6.64
Diallyl Sulfide (68° F.) 4.9
Diamond 5.5-10.0
Diaphenylmethane 2.7
Diaplmitin 3.5
Dibeuzofuran (212° F.) 3.0
Dibenzyl Sebacate (68° F.) 4.6
Dibenzylamine (68° F.) 3.6
Dibroheptane (24° F.) 5.08
Dibromobenzene (68° F.) 8.8
Dibromobutane (68° F.) 5.7
Dibromoethylene (Cis-1,2) (32° F.) 7.7
Dibromoheptane (76° F.) 5.1
Dibromohexane (76° F.) 5.0
Dibromomethane (50° F.) 7.8
Dibromopropane (68° F.) 4.3
Dibromopropyl Alcohol (70° F.) 9.1
Dibutyl Phthalate (86° F.) 6.4
Dibutyl Sebacate (86° F.) 4.5
Dibutyl Tartrate 109 9.4
Dichloracetic Acid (20° F.) 10.7

TABLE 1-continued (Dielectric Materials)

Dichloracetic Acid (72° F.) 8.2
Dichloracetone (68° F.) 14.0
Dichlorobenzene (127° F.) 2.8
Dichloroethane (68° F.) 16.7
Dichloroethane (1,2)(77° F.) 10.3
Dichloroethylene (62° F.) 4.6
Dichloromethane (68° F.) 9.1
Dichlorostyrene (76° F.) 2.6
Dichlorotoluene (68° F.) 6.9
Dictyl Phthalate 5.1
Dicyclohexyl Adipate (95° F.) 4.8
Diebenzylamine (68° F.) 3.6
Diethyl Benzalmalonate (32° F.) 8.0
Diethyl Disulfide (66° F.) 15.9
Diethyl Dl-Malate (64° F.) 10.2
Diethyl Glutarate (86° F.) 6.7
Diethyl I-Malate 9.5
Diethyl Kerone (58° F.) 17.3
Diethyl L-Malate (68° F.) 9.5
Diethyl Malonate (70° F.) 7.9
Diethyl Oxalate (70° F.) 8.2
Diethyl Oxaloacetate (66° F.) 6.1
Diethyl Racemate (68° F.) 4.5
Diethyl Sebacate (86° F.) 5.0
Diethyl Succinate (86° F.) 6.6
Diethyl Succinosuccinate (66° F.) 2.5
Diethyl Sulfide (68° F.) 7.2
Diethyl Sulfite (68° F.) 15.9
Diethyl Tartrate (68° F.) 4.5
Diethyl Zinc (68° F.) 2.6
Diethyl 1-Malate (68° F.) 9.5
Diethyl-Dimalate 10.2
Diethylamine (68° F.) 3.7
Diethylaniline (66° F.) 5.5
Dihydrocaroone (66° F.) 8.7
Dihydrocarvone (66° F.) 8.5
Diimylamine (64° F.) 2.5
Dioamylene (62° F.) 2.4
Diiodoethylene 1 (80° F.) 4.0
Diiodomethane (77° F.) 5.3
Diisoamyl (62° F.) 2.0
Diisoamylene 2.4
Diisobutylamine (71° F.) 2.7
Dimethoxybenzene (73° F.) 4.5
Dimethyl Ethyl (68° F.) 11.7
Dimethyl Ethyl Carbinol (68° F.) 11.7
Dimethyl Malonate (68° F.) 10.4
Dimehyl Oxalate (68° F.) 3.0
Dimethyl Pentane (20° F.) 1.912
Dimethyl Phthalate (75° F.) 8.5
Dimethyl Sulfate (68° F.) 55.0
Dimethyl Sulfide (68° F.) 6.3
Dimethyl-1-Hydroxybenzene (62° F.) 4.8
Dimethyl-2-Hexane (68° F.) 2.4
Dimethylamine (32° F.) 6.3
Dimethylaniline (68° F.) 4.4
Dimethylbromoethylene (68° F.) 6.7
Dimethylheptane (68° F.) 1.9
Dimethylpentane (68° F.) 1.9
Dimethylquinoxaline (76° F.) 2.3
Dimethyltouidine (68° F.) 3.3
Dinitrogen Oxide (32° F.) 1.6
Dinitrogen Tetroxide (58° F.) 2.5
Dioctyl Phthalate (76° F.) 5.1
Dioxane 1,4 (77° F.) 2.2
Dipalmitin (161° F.) 3.5
Dipentene (68° F.) 2.3
Dipenylamine (125° F.) 3.3
Diphemylethane (230° F.) 2.4
Diphemylothene (62° F.) 12.6
Diphenyl 1(66° F.) 2.5
Diphenyl Ether (82° F.) 3.9
Diphenylamine (124° F.) 3.3
Diphenylethane (110° F.) 2.38
Diphenytmethane (62° F.) 2.6
Dipropyl Ketone (62° F.) 12.6
Dipropylamine (70° F.) 2.9
Distearin (172° F.) 3.3
Docosane (122° F.) 2.0
Dodecamethylcyclohexisloxane (68° F.) 2.6
Dodecamethylpentasiloxane (68° F.) 2.5
Dodecane (68° F.) 2.0
Dodecanol (76° F.) 6.5
Dodecyne (76° F.) 2.2
Dolomite 6.8-8.0
Dowtherm (70° F.) 3.4
Return to top
E Ebonite 2.5-2.9
Emery Sand 16.5
Epichlorchydrin (68° F.) 22.9
Epoxy Resin (Cast) 3.6
Ethanediamine (68° F.) 14.2
Ethanethiol (58° F.) 6.9
Ethanethiolic Acid (68° F.) 13.0
Ethanol (77° F.) 24.3
Ethelene Diamine (18° F.) 16.0
Ethelene Oxide-1 13.9
Ethoxy-3-Methylbutane (68° F.) 4.0
Ethoxybenzene (68° F.) 4.2
Ethoxyethyl Acetate (86° F.) 7.6
Ethoxynaphthalone (66° F.) 3.3
Ethoxypentane (73° F.) 3.6
Ethoxytoluene (68° F.) 3.9
Ethyl Acetate (77° F.) 6.0
Ethyl Acetoacetate (71° F.) 15.9
Ethyl Acetoncoxalate (66° F.) 16.1
Ethyl Acetophenoneoxalate (66° F.) 3.3
Ethyl Alcohol (77° F.) 24.3
Ethyl Alcohol (See Ethanol)
Ethyl Amyl Ether (68° F.) 4.0
Ethyl Benzene (68° F.) 2.5
Ethyl Benzoate (68° F.) 6.0
Ethyl Benzoylacetate (68° F.) 12.8
Ethyl Benzoylacetoacetate (70° F.) 8.6
Ethyl Benzyl Ether (68° F.) 3.8
Ethyl Bromide (64° F.) 4.9
Ethyl Bromoisobutyrate (68° F.) 7.9
Ethyl Bromopropionate (68° F.) 9.4
Ethyl Butyrate (66° F.) 5.1
Ethyl Carbonate (68° F.) 3.1
Ethyl Carbonate (121° F.) 14.2
Ethyl Cellulose 2.8-3.9
Ethyl Chloracetate (68° F.) 11.6
Ethyl Chloroformate (68° F.) 11.3
Ethyl Chloropropionate (68° F.) 10.1
Ethyl Cinnamate (66° F.) 5.3
Ethyl Cyanoacetate (68° F.) 27.0
Ethyl Cyclobutane (68° F.) 2.0
Ethyl Dodecanoate (68° F.) 3.4
Ethyl Ether (−148° F.) 8.1
Ethyl Ether (−40° F.) 5.7
Ethyl Ether (68° F.) 4.3
Ethyl Ethoxybenzoate (70° F.) 7.1
Ethyl Formate (77° F.) 7.1
Ethyl Formylphenacetate (68° F.) 3.0
Ethyl Fumarate (73° F.) 6.5
Ethyl Hydroxy-Tetracarboxylate 5.9
Ethyl Hydroxy-Tetrocarboxylate 2.7
Ethyl Hydroxymethylenephenylacet 5.00
Ethyl Hydroxymethylenomalonate 6.6
Ethyl Iodide (68° F.) 7.4
Ethyl Isothiocyanate (68° F.) 19.7
Ethyl Levulinete (70° F.) 12.1
Ethyl Maleate (73° F.) 8.5
Ethyl Mercaptan (68° F.) 8.0
Ethyl Nitrate (68° F.) 19.7
Ethyl Oleate (80° F.) 3.2
Ethyl Palmitate (68° F.) 3.2
Ethyl Phenylacetate (70° F.) 5.4
Ethyl Propionate (68° F.) 5.7
Ethyl Salicylate (70° F.) 8.6
Ethyl Silicate (68° F.) 4.1
Ethyl Stearate (104° F.) 3.0
Ethyl Thiocyanate (68° F.) 29.6

TABLE 1-continued (Dielectric Materials)

Ethyl Trichloracetate (68° F.) 7.8
Ethyl Undecanoate (68° F.) 3.6
Ethyl Valerate (68° F.) 4.7
Ethyl 1-Brobutyrate (68° F.) 8.0
Ethyl 2-Iodopropionate (68° F.) 8.8
Ethylamine (70° F.) 6.3
Ethylaniline (68° F.) 5.9
Ethylbenzene (76° F.) 3.0
Ethylene Chloride (68° F.) 10.5
Ethylene Chlorohydrin (77° F.) 26.0
Ethylene Cyanide (136° F.) 58.3
Ethylene Diamine (64° F.) 16.0
Ethylene Gylcol (68° F.) 37.0
Ethylene Iodide 3.4
Ethylene Oxide 25 14.0
Ethylene Tetraflouride 1.9-2.0
Ethylenechlorohydrin (75° F.) 25.0
Ethylenediamine (64° F.) 16.0
Ethylic Resin 2.2-2.3
Ethylpentane (68° F.) 1.9
Ethyltoluene (76° F.) 2.2
Etibine (−58° F.) 2.5
Eugenol (64° F.) 6.1
Return to top
F Fab (From Box, 8% Moisture) 1.3
Fenchone (68° F.) 12.0
Fermanium Tetrachloride (76° F.) 2.4
Ferric Oleate (68° F.) 2.6
Ferrochromium 1.5-1.8
Ferromanganese 5.0-5.2
Ferrous Oxide (60° F.) 14.2
Ferrous Sulfate (58° F.) 14.2
Flour 2.5-3.0
Flourine (−332° F.) 1.5
Flourspar 6.8
Fluorotoluene (86° F.) 4.2
Fly Ash 1.9-2.6
Formalin 2.3
Formamide (68° F.) 84.0
Formic Acid (60° F.) 58.0
Forsterite 6.2
Freon 11 (70° F.) 3.1
Freon 113 (70° F.) 2.6
Freon 12 (70° F.) 2.4
Fuller's Earth 1.8-2.2
Furan (77° F.) 3.0
Furfural (68° F.) 42.0
Furfuraldehyde (68° F.) 41.9
Return to top
G Gasoline (70° F.) 2.0
Gerber Oatmeal (In Box) 1.5
Germanium Tetrachloride (77° F.) 2.4
Glass 3.7-10
Glass (Silica) 3.8
Glass, Bead 3.1
Glass, Granule 6-7
Glass, Raw Material 2.0-2.5
Glucoheptitol (248° F.) 27.0
Glycerin, Liquid 47-68
Glycerol (77° F.) 42.5
Glycerol (32° F.) 47.2
Glycerol Phthalate (Cast Alkyd) 3.7-4.0
Glycol Triocetate (70° F.) 6.0
Glycol(77° F.) 37.0
Glycol (122° F.) 35.6
Glycolic Nitrile (68° F.) 27.0
Grain 3-8
Graphite 12-15
Guaiacol 0 11.0
Gypsum 2.5-6.0
Return to top
H Hagemannie Ester (68° F.) 10.6

TABLE 1-continued (Dielectric Materials)

Halowax 4.5
Heavy Oil 3
Heavy Oil, C 2.6
Helium-3 (58° F.) 1.055
Helium, Liquid 1.05
Heptadecanone (140° F.) 5.3
Heptane (68° F.) 1.9
Heptane, Liquid 1.9-2.0
Heptanoic Acid 2.5
Heptanoic Acield (71° F.) 2.59
Heptanone (68° F.) 11.9
Heptaonic Acid (160° F.) 2.6
Heptyl Alcohol (70° F.) 6.7
Hexamethyldisiloxane (68° F.) 2.2
Hexane (−130° F.) 2.0
Hexanol (77° F.) 13.3
Hexanone (59° F.) 14.6
Hexdecamethylcycloheptasiloxane (68° F.) 2.7
Hexyl Iodide (68° F.) 6.6
Hexylene (62° F.) 2.0
Hexyliodide (68° F.) 6.6
Hydrazine (68° F.) 52.0
Hydrochloric Acid (64° F.) 4.60
Hydrocyanic Acid (70° F.) 2.3
Hydrocyanic Acid (32° F.) 158.0
Hydrogen (440° F.) 1.23
Hydrogen (212° F.) 1.000284
Hydrogen Iodide (72° F.) 2.9
Hydrogen Bromide (24° F.) 3.8
Hydrogen Bromide (−120° F.) 7.0
Hydrogen Chloride (82° F.) 4.6
Hydrogen Chloride (−188° F.) 12.0
Hydrogen Cyanide (70° F.) 95.4
Hydrogen Fluoride (32° F.) 84.2
Hydrogen Fluoride (−100° F.) 17
Hydrogen Iodide (72° F.) 2.9
Hydrogen Peroxide (32° F.) 84.2
Hydrogen Peroxide 100% 70.7
Hydrogen Peroxide 35% 121.0
Hydrogen Sulfide (−84° F.) 9.3
Hydrogen Sulfide (48° F.) 5.8
Hydrofluoric Acid (32° F.) 83.6
Hydroxy-4-Methy-2-Pentanone (76° F.) 18.2
Hydroxymethylene Camphor (86° F.) 5.2
Hydroxymethylenehydroxymethyleneacetoacetate 7.8
Hydroxymethylenebenzyl Cyanide (68° F.) 6.0
Hydrozine (68° F.) 52.9
Return to top
I Ido-Iodohexadeoane (68° F.) 3.5
Idoheptane (71° F.) 4.9
Idohexane (68° F.) 5.4
Idomethane (68° F.) 7.0
Idopoctane (76° F.) 4.6
Idotoluene (68° F.) 6.1
Ilmenite 6.0-7.0
Inadol (140° F.) 7.8
Indonol (60° F.) 7.8
Iodine (107° F.) 118.0
Iodine 11
Iodine (250° F.) 118.0
Iodine (Granular) 4.0
Iodioctane 4.6
Iodioctane (24° F.) 4.62
Iodobenzene (68° F.) 4.6
Iodoheptane (22° F.) 4.92
Iodohexane (20° F.) 5.37
Iodomethane (20° F.) 7.0
Iodotolune (20° F.) 6.1
Iron Oxide 14.2
Iso Butyl Alcohol 18.7-31.7
Iso Butyl Iodide 5.8
Iso Butyl Nitrate 11.9
Iso Butylamine 4.5
Iso Butyric Acid 2.7
Iso Butyronitrile 20.8
Iso Valeric Acid (68° F.) 2.6

TABLE 1-continued

(Dielectric Materials)

Iso-Butyl Alcohol (−112° F.) 31.7
Iso-Butyl Alcohol (32° F.) 20.5
Iso-Butyl Alcohol (68° F.) 18.7
Iso-Butyl Iodide (68° F.) 5.8
Iso-Butyl Nitrate (66° F.) 11.9
Iso-Butylacetate (68° F.) 5.6
Iso-Butylamine (70° F.) 4.5
Iso-Butyric Acid (68° F.) 2.7
Iso-Butyronitrile 23.9-20.8
Iso-Butyronitrile (75° F.) 20.8
Iso-Iodohexadecane 3.5
Iso-Propyl Alcohol (68° F.) 18.3
Iso-Propyl Nitrate (66° F.) 11.5
Iso-Valeric Acid (68° F.) 2.7
Isoamyl Valerate (19° F.) 3.6
Isoamyl Acetate (68° F.) 5.6
Isoamyl Alcohol (74° F.) 15.3
Isoamyl Bromide (76° F.) 6.1
Isoamyl Butyrate (68° F.) 3.9
Isoamyl Chloracetate (68° F.) 7.8
Isoamyl Chloride (64° F.) 6.4
Isoamyl Chloroacetate 7.8
Isoamyl Chloroformate (68° F.) 7.8
Isoamyl Lodide (65° F.) 5.6
Isoamyl Propionate (68° F.) 4.2
Isoamyl Salicylate (68° F.) 5.4
Isoamyl Valerate (66° F.) 3.6
Isoamylpropionate 4.2
Isobuthyl Resin 1.4-2.1
Isobutyl Acetate (68° F.) 5.6
Isobutyl Alcohol (68° F.) 18.7
Isobutyl Benzoate (68° F.) 5.9
Isobutyl Bromide (20° F.) 4.0
Isobutyl Bromide (68° F.) 6.6
Isobutyl Butyrate (68° F.) 4.0
Isobutyl Chloride (68° F.) 7.1
Isobutyl Chloroformate (68° F.) 9.2
Isobutyl Cyanide (74° F.) 13.3
Isobutyl Formate (66° F.) 6.5
Isobutyl Iodide (68° F.) 5.8
Isobutyl Nitrate (66° F.) 11.9
Isobutyl Rininoleate (70° F.) 4.7
Isobutyl Valerate (66° F.) 3.8
Isobutylamine (70° F.) 4.5
Isobutylbenzene (62° F.) 2.3
Isobutylbenzoate (68° F.) 5.9
Isobutylene Bromide (68° F.) 4.0
Isobutyric Acid (68° F.) 2.6
Isobutyric Acid (122° F.) 2.7
Isobutyric Anhydride (68° F.) 13.9
Isobutyronitrile (77° F.) 20.8
Isocapronitrile (68° F.) 15.7
Isooctane 2.1-2.3
Isophthalic Acid 1.4
Isoprene (77° F.) 2.1
Isopropyl Alcohol 18.3
Isopropyl Benzene (68° F.) 2.4
Isopropyl Nitrate 11.5
Isopropylamine (68° F.) 5.5
Isopropylether (77° F.) 3.9
Isoquinoline (76° F.) 10.7
Isosafrol (70° F.) 3.4
Return to top

J

Jet Fuel (Jp4) (70° F.) 1.7
Jet Fuel (Military Jp4) 1.7
Return to top

K

Kent Wax 6.5-7.5
Kerosene (70° F.) 1.8
Kynar 2.0
Return to top

L

Lactic Acid (61° F.) 22.0
Lactronitrile (68° F.) 38.4
Lad Oxide 25.9
Lead Acetate 2.5
Lead Carbonate (60° F.) 18.1
Lead Chloride 4.2
Lead Nitrate 37.7
Lead Nomoxide (60° F.) 25.9
Lead Oleate (64° F.) 3.2
Lead Oxide 25.9
Lead Sulfate 14.3
Lead Sulfite 17.9
Lead Tetrachloride (68° F.) 2.8
Lime 2.2-2.5
Limonene (68° F.) 2.3
Linde 5a Molecular Sieve, Dry 1.8
Linoleic Acid (32° F.) 2.6-2.9
Linseed Oil 3.2-3.5
Liquified Air 1.5
Liquified Hydrogen 1.2
Lityium Chloride 11.1
Lonone (65° F.) 10.0
LPG 1.6-1.9
Return to top

M

M-Bromoaniline (66° F.) 13.0
M-Bromotoluene (137° F.) 5.4
M-Chloroanaline (66° F.) 13.4
M-Chlorotoluene (68° F.) 5.6
M-Creosol 5
P-Cresol (24° F.) 5.0
O-Cresol (77° F.) 11.5
M-Dichlorobenzene (77° F.) 5.0
M-Dinitro Benzene (68° F.) 2.8
M-Nitrotoluene (68° F.) 23.8
M-Sylene 2.4
M-Toluidine (64° F.) 6.0
M-Xylene (68° F.) 2.4
Maganese Dioxide 5-5.2
Magnesium Oxide 9.7
Magnesium Sulfate 8.2
Malachite 7.2
Maleic Anhydride (140° F.) 51.0
Malolic Anhydride 51
Malonic Nitrile (97° F.) 47.0
Mandelic Nitrite (73° F.) 18.1
Mandelitrile (73° F.) 17.0
Mannitol (71° F.) 3.0
Margarine, Liquid 2.8-3.2
Melamine Formaldehyde (MF)
(MF) Molding Resin 5.5-6.0
(MF) With Alpha Cellulose Filler 7.2-8.2
(MF) With Asbestos Filler 6.1-6.7
(MF) With Cellulose Filler 4.7-7.0
(MF) With Flock Filter 5.0-6.0
(MF) With Macerated Fabric Fille 6.5-6.9
Melamine Resin 4.7-10.9
Menthol (42° F.) 3.95
Menthol (107° F.) 4.0
Menthonol (43° F.) 2.1
Menthonol (110° F.) 2.1
Mercuric Chloride 3.2
Mercurous Chloride 9.4
Mercury (298° F.) 1.00074
Mercury Chloride 7-14
Mercury Diethyl (68° F.) 2.3
Mesityl Oxide (68° F.) 15.4
Mesitylene (68° F.) 2.4
Mesitylene 3.4
Methal Cyanoacetate (69° F.) 29.4
Methallmine (77° F.) 9.4
Methane (−280° F.) 1.7
Methane, Liquid 1.7
Methanol (77° F.) 32.6
Methlene Idide 5.1
Methoxy-4-Methylphenol (60° F.) 11.0
Methoxybenzene (76° F.) 4.3
Methoxyethyl Stearate (140° F.) 3.4
Methoxyphenol (82° F.) 11.0

TABLE 1-continued (Dielectric Materials)

Methoxytoluene (68° F.) 3.5
Methyl Acetate (77° F.) 6.7
Methyl Acetophenoneoxalate (64° F.) 2.8
Methyl Alcohol (−112° F.) 56.6
Methyl Alcohol (32° F.) 37.5
Methyl Alcohol (68° F.) 33.1
Methyl Benzoate (68° F.) 6.6
Methyl Butane (68° F.) 1.8
Methyl Butyl Ketone (62° F.) 12.4
Methyl Butyrate (68° F.) 5.6
Methyl Chloride (77° F.) 12.9
Methyl Chloroacetate (68° F.) 12.9
Methyl Ether (78° F.) 5.0
Methyl Ethyl Ketone (72° F.) 18.4
Methyl Ethyl Ketoxime (68° F.) 3.4
Methyl Formate (68° F.) 8.5
Methyl Heptanol (68° F.) 5.3
Methyl Iodide (68° F.) 7.1
Methyl Kexyl Ketone (62° F.) 10.7
Methyl Methacrylate (Cast) 2.7-3.2
Methyl Nitrobenzoate (80° F.) 27.0
Methyl O-Methoxybenzoate (70° F.) 7.8
Methyl P-Toluate (91° F.) 4.3
Methyl Propionate (66° F.) 5.4
Methyl Propyl Ketone (58° F.) 16.8
Methyl Salicylate (68° F.) 9.0
Methyl Thiocyanate (68° F.) 35.9
Methyl Valerate (66° F.) 4.3
Methyl 5 Ketocyclohexylene (68° F.) 24.0
Methyl-1-Cyclopentanol (35° F.) 6.9
Methyl-2 4-Pentandeiol (86° F.) 24.4
Methyl-2-Pentanone (68° F.) 13.1
Methylal (68° F.) 2.7
Methylaniline (68° F.) 6.0
Methylbenzylamine (65° F.) 4.4
Methylcyclohexanol (68° C.) 13.0
Methylcyclohexanone (192° F.) 18.0
Methylcylopentane (68° F.) 2.0
Methylene Iodide (70° F.) 5.1
Methyleneaceloacetate (70° F.) 7.8
Methylenemalonate (72° F.) 6.6
Methylenephenylacetate (68° F.) 5.0
Methylether, Liquid 5
Methylhexane (68° F.) 1.9
Methylisocyanate (69° F.) 29.4
Methyloctane (69° F.) 30.0
Methylomine (21° F.) 10.5
Methylphenyl Hydrazin (66° F.) 7.3
Methylpyridine (2) (68° F.) 9.8
Metnoxy-Four-Methyl Phenol 11
Mica 2.6-3.2
Mica 7.0
Mica (Glass Bonded) 6.9-9.2
Micanite 1.8-2.6
Mills (Dry Powder) 1.8
Mineral Oil (80° F.) 2.1
Monomyristin (158° F.) 6.1
Monopalmitin (152° F.) 5.3
Monostearin (170° F.) 4.9
Morpholine (77° F.) 7.3
Return to top
N N-Butyl Alcohol (66° F.) 7.8
N-Butyl Bromide (68° F.) 6.6
N-Butyl Formate (−317° F.) 2.4
N-Butyl Iodide (77° F.) 6.1
N-Butylacetate (19° F.) 5.1
N-Butyricaid (68° F.) 2.9
N-Hexane (68° F.) 1.9
N-Methylaniline (68° F.) 6.0
N-Pentane (68° F.) 1.8
Naphthy Ethyl Ether (67° F.) 3.2
Napthalene (185° F.) 2.3
Napthalene (68° F.) 2.5
Napthonitrile (70° F.) 6.4
Napthyl Ethyl Ether (67° F.) 3.2
Neon (68° F.) 1.000127
Neoprene 6-9
Nitric Acid (14° C.) 50.0 +/− 10.0
Nitroanisole (68° F.) 24.0
Nitrobenzal Doxime (248° F.) 48.1
Nitrobenzene (68° F.) 35.7
Nitrobenzene (77° F.) 34.8
Nitrobenzene (176° F.) 26.3
Nitrobenzyl Alcohol (68° F.) 22.0
Nitrocellulose 6.2-7.5
Nitroethane (68° F.) 19.7
Nitrogen (336° F.) 1.454
Nitrogen (68° F.) 1.000580
Nitroglycerin (68° F.) 19.0
Nitromethane 22.7-39.4
Nitromethane (68° F.) 39.4
Nitrosodimethylamine (68° F.) 54.0
Nitrosyl Bromide (4° F.) 13.0
Nitrosyl Chloride (10° F.) 18.0
Nitrotoluene (68° F.) 1.96
Nitrous Oxide (32° F.) 1.6
Nonane (68° F.) 2.0
Nylon 4.0-5.0
Nylon Resin 3.0-5.0
Return to top
O O-Bromotoluene (137° F.) 4.3
O-Chlorophenol (66° F.) 8.2
O-Chlorotoluene (68° F.) 4.5
O-Cresol (77° F.) 11.5
O-Dichlorobenzene (77° F.) 7.5
O-Nitro Analine (194° F.) 34.5
O-Nitrotoluene (68° F.) 27.4
O-Toluidine (64° F.) 6.3
O-Xylene (68° F.) 2.6
Octadecanol 3.42
Octadecanol (136° F.) 3.4
Octamethylcyclotetrasiloxane (68° F.) 2.4
Octamethyltrisiloxane (68° F.) 2.3
Octane (24° F.) 1.061
Octane (68° F.) 2.0
Octanone (68° F.) 10.3
Octene (76° F.) 2.1
Octyl Alcohol (64° F.) 3.4
Octyl Iodide (68° F.) 4.9
Octylene (65° F.) 4.1
Oil, Peanut (52° F.) 3.0
Oil, Almond (68° F.) 2.8
Oil, Cotton Seed (57° F.) 3.1
Oil, Grapeseed (61° F.) 2.9
Oil, Lemon (70° F.) 2.3
Oil, Linseed 3.4
Oil, Olive (68° F.) 3.1
Oil, Paraffin (68° F.) 2.2-4.7
Oil, Petroleum (68° F.) 2.1
Oil, Pyranol (68° F.) 5.3
Oil, Sesame (55° F.) 3.0
Oil, Sperm (68° F.) 3.2
Oil, Terpentine (68° F.) 2.2
Oil, Transformer (68° F.) 2.2
Oleic Acid (68° F.) 2.5
Oleric Acid 2.4-2.5
One-Dichloroethane 10.7
One-Diethoxyethane 3.8
Opal Wax 3.1
Organic Cold Molding Compound 6.0
Oxygen (−315° F.) 1.51
Oxygen (68° F.) 1.000494
Return to top
P P-Bromotoluene (137° F.) 5.5
P-Chlorophenol (130° F.) 9.5
P-Chlorotoluene (68° F.) 6.1
P-Cresol (70° F.) 5.6
P-Cresol (137° F.) 9.9
P-Cymene (63° F.) 2.3
P-Dibromobenzene (190° F.) 4.5

TABLE 1-continued (Dielectric Materials)

P-Dichlorobenzine (68° F.) 2.86
P-Dichlorobenzine (120° F.) 2.4
P-Nitro Analine (320° F.) 56.3
P-Nitrotoluene (137° F.) 22.2
P-Toludine 3.0
P-Toluidine (130° F.) 5.0
P-Xylene (68° F.) 2.3
Paint 5-8
Palmitic Acid (160° F.) 2.3
Paper (Dry) 2.0
Paraffin 1.9-2.5
Paraffin Wax 2.1-2.5
Paraldehyde (68° F.) 14.5
Paraldehyde (77° F.) 13.9
Parawax 2.3
Parrafin Chloride 2.0-2.3
Penanthiene (68° F.) 2.8
Pentachloroethane (60° F.) 3.7
Pentadiene 1,3 (77° F.) 2.3
Pentane (68° F.) 1.8
Pentanol (77° F.) 13.9
Pentanone (2) (68° F.) 15.4
Pentene (1) (68° F.) 2.1
Pentochlorethane 3.7
Perlite 1.3-1.4
Petroleum 2.0-2.2
Phenanthrene (230° F.) 2.7
Phenathiene (68° F.) 2.8
Phenathrene (110° F.) 2.72
Phenetole (70° F.) 4.5
Phenol (118° F.) 9.9
Phenol (104° F.) 15.0
Phenol (50° F.) 4.3
Phenol Ether (85° F.) 9.8
Phenol Formaldehyde Resin (PFR) 4.5-5.0
(PFR) With Asbestos Filler 5.0-7.0
(PFR) With Glass Fiber Filler 6.6-7.0
(PFR) With Mica Filler 4.2-5.2
(PFR) With Mineral Filler (Cast) 9.0-15.0
(PFR) With Sisal Fiber 3.0-5.0
(PFR) With Wood Flour Filler 4.0-7.0
Phenol Resin 4.9
Phenol Resin, Cumulated 4.6-5.5
Phenoxyacetylene (76° F.) 4.8
Phentidine (70° F.) 7.3
Phenyl Acetate (68° F.) 6.9
Phenyl Ether (86° F.) 3.7
Phenyl Iso Thiocyanate (68° F.) 10.7
Phenyl Isocyanate (68° F.) 8.9
Phenyl Urethane 2.7
Phenyl-L-Lropane (68° F.) 2.7
Phenyl-One-Iropane 2.7
Phenyl-I-Propane (68° F.) 1.7
Phenylacetaldehyde (68° F.) 4.8
Phenylacetic (68° F.) 3.0
Phenylacetonitrile (80° F.) 18.0
Phenylethanol (68° F.) 13.0
Phenylethyl Acetate (58° F.) 4.5
Phenylethylene (77° F.) 2.4
Phenylhydrazine (72° F.) 7.2
Phenylsalicylate (122° F.) 6.3
Phosgene (32° F.) 4.7
Phosphine (−76° F.) 2.5
Phosphorus (93° F.) 4.1
Phosphorus Oxychloride (72° F.) 14.0
Phosphorus Pentachloride (320° F.) 2.8
Phosphorus Tribromide 3.9
Phosphorus Tribromide (68° F.) 3.9
Phosphorus Trichloride (77° F.) 3.4
Phosphorus, Red 4.1
Phosphorus, Yellow 3.6
Phosphoryl Chloride (70° F.) 13.0
Phosphrous 4.1
Phtalide (166° F.) 36.0
Phthalic Acid 5.1-6.3
Phthalide (74° F.) 36.0
Pinacolin (62° F.) 12.8
Pinacone (75° F.) 7.4
Pine Tree Resin, Powder 1.5-1.8
Pinene (68° F.) 2.7
Piperidine (68° F.) 5.9
Plaster 2.5-6.0
Plastic Grain 65-75
Plastic Pellets 1.1-3.2
Plastic Sulphur, Unground 1.5
Platinum Catalyst 6.5-7.5
Poly Propylene 1.5
Polyacetal 3.6-3.7
Polyacetol Resin 2.6-3.7
Polyacrylic Ester 3.5
Polyamide 2.5-2.6
Polybutylene 2.2-2.3
Polycaprolactam 2.0-2.5
Polycarbonate 2.9-3.0
Polycarbonate Resin 2.9-3.0
Polyester Resin 2.8-4.5
Polyester Resin (Flexible) 4.1-5.2
Polyester Resin (Glass Fiber Filled) 4.0-4.5
Polyester Resin (Ridgid Cast) 2.8-4.1
Polyether Chloride 2.9
Polyether Resin 2.8-8.1
Polyether Resin, Unsaturated 2.8-5.2
Polyethylene 2.2-2.4
Polyethylene, Pellet 1.5
Polymide 2.8
Polymonochloro Pifluoroethylene 2.5
Polypropylene 1.5
Polypropylene Powder 1.25
Polypropylene, Pellet 1.5-1.8
Polystyrene Resin 2.4-2.6
Polystyrol 2.0-2.6
Polysulphonic Acid 2.8
Polytetra Fluoroethylene 2.0
Polyvinyl Alcohol 1.9-2.0
Polyvinyl Chloride 3.4
Polyvinylchloride Resin 5.8-6.8
Porcelain 5.0-7.0
Porcelain With Zircon 7.1-10.5
Potassium Aluminum Sulphate 3.8
Potassium Carbonate (60° F.) 5.6
Potassium Chlorate 5.1
Potassium Chloride 4.6
Potassium Chloronate 7.3
Potassium Iodide 5.6
Potassium Nitrate 5.0
Potassium Sulfate 5.9
Potassium Chloromate 7.3
Potassium Chloride 5.0
Propane (Liquid) (32° F.) 1.6
Propanediol (68° F.) 32.0
Propanol (177° F.) 20.1
Propene (68° F.) 1.9
Propionaldehyde (62° F.) 18.9
Propionic Acid (58° F.) 3.1
Propionic Anhydride (60° F.) 18.0
Propionitrile (68° F.) 27.7
Propy Butyrate (68° F.) 4.3
Propyl Acetate (68° F.) 6.3
Propyl Alcohol (68° F.) 21.8
Propyl Benzene (68° F.) 2.4
Propyl Bromide (68° F.) 7.2
Propyl Butyrate (68° F.) 4.3
Propyl Chloroformate (68° F.) 11.2
Propyl Ether (78° F.) 3.4
Propyl Formate (66° F.) 7.9
Propyl Nitrate (64° F.) 14.2
Propyl Propionate (68° F.) 4.7
Propyl Valerate (65° F.) 4.0
Propylene Liquid 11.9
Psuedocumene (60° F.) 2.4
Pulegone (68° F.) 9.5
Pulezone (66° F.) 9.7
PVC, Powder 1.4
Pyrex 4.8
Pyrex Glass 4.3-5.0
Pyridine (68° F.) 12.5

TABLE 1-continued

(Dielectric Materials)

Pyroceram 3.5-4.5
Pyrrole (63° F.) 7.5
Return to top
Q

Quartz 4.2
Quinoline (77° F.) 9.0
Quinoline (−292° F.) 2.6
Return to top
R

Reburned Lime 2.2
Refractory (Cast) 6.7
Refractory (For Casting) 1.8-2.1
Resorcinol 3.2
Rice (Dry) 3.5
Rice Bran 1.4-2.0
Rouge 1.5
Rouge (Jewelers) 1.5-1.6
Rubber 3.0
Rubber (Chlorinated) 3.0
Rubber (Hard) 2.8
Rubber (Isomerized) 2.4-3.7
Rubber Cement 2.7-2.9
Rubber Chloride 2.1-2.7
Rubber, Raw 2.1-2.7
Rubber, Sulphurized 2.5-4.6
Ruby 11.3
Rutile 6.7
Return to top
S Safrol (70° F.) 3.1
Salicylaldehyde (68° F.) 13.9
Salt 3.0-15.0
Sand (Dry) 5.0
Sand (Silicon Dioxide) 3-5.0
Santowax (70° F.) 2.3
Selenium 6.1-7.4
Selenium 11
Selenium (482° F.) 5.4
Selevium (249° F.) 5.4
Sesame 1.8-2.0
Shellac 2.0-3.8
Silica Aluminate 2
Silica Sand 2.5-3.5
Silicon 11.0-12.0
Silicon Dioxide 4.5
Silicon Tetrachloride (60° F.) 2.4
Silicone Molding Compound (SMC)
(SMC) (Glass Fiber Filled) 3.7
Silicone Oil 2.2-2.9
Silicone Resin, Liquid 3.5-5.0
Silicone Rubber 3.2-9.8
Silicone Varnish 2.8-3.3
Silk 2.5-3.5
Silver Bromide 12.2
Silver Chloride 11.2
Silver Cyanide 5.6
Slaked Lime, Powder 2.0-3.5
Slate 6.0-7.5
Smithsonite 9.3
Soap Powders 1.2-1.7
Sodium Carbonate 5.3-8.4
Sodium Carbonate (Anhyd) 8.4
Sodium Carbonate (10h2O) 5.3
Sodium Chloride 5.9
Sodium Chloride (Salt) 6.1
Sodium Cyanide 7.55
Sodium Dichromate 2.9
Sodium Nitrate 5.2
Sodium Oleate (68° F.) 2.7
Sodium Perchlorate 5.4
Sodium Phosphate 1.6-1.9
Sodium Porchlorate 5.4
Sodium Sulphide 5
Sorbitol (176° F.) 33.5
Soy Beans 2.8

Stannec Chloride (72° F.) 3.2
Starch 3-5
Starch, Paste 1.7-1.8
Stearic Acid (160° F.) 2.3
Stearine 2.3
Steatite 5.5-7-5
Styrene (77° F.) 2.4
Styrene (Modified) 2.4-3.8
Styrene (Phenylethane) (77° F.) 2.4
Styrene Resin 2.3-3.4
Succinamide (72° F.) 2.9
Succinic Acid (78° F.) 2.4
Sucrose 3.3
Sucrose (Mean) 3.3
Sugar 3.0
Sugar, Granulated 1.5-2.2
Sulfur 1.6-1.7
Sulfur Dioxide (−4° F.) 17.6
Sulfur Dioxide (32° F.) 15.0
Sulfur Monochloride (58° F.) 4.8
Sulfur Trioxide (64° F.) 3.1
Sulfurous Oxychloride (72° F.) 9.1
Sulfuryl Chloride (72° F.) 10.0
Sulphur (244° F.) 3.5
Sulphur (450° F.) 3.5
Sulphur Dioxide (32° F.) 15.6
Sulphur Trioxide (70° F.) 3.6
Sulphur, Liquid 3.5
Sulphur, Powder 3.6
Sulphuric Acid (68° F.) 84.0
Sulfuric Acid (25° C.) 100.0
Supphuric Oxychloride (72° F.) 9.2
Syrup 50-80
Syrup Wax 2.5-2.9
Return to top
T Tantalum Oxide 11.6
Tartaric Acid (68° F.) 6.0
Tartaric Acid (14° F.) 35.9
Teflon 2.0
Teflon (4f) 2.0
Teflon, FEP 2.1
Teflon, PCTFE 2.3-2.8
Teflon, PTFE 2
Tepineol 2.8
Terpinene (70° F.) 2.7
Terpineol (72° F.) 2.8
Tetrabromoethane (72° F.) 7.0
Tetrachloroethylene (70° F.) 2.5
Tetradecamethyltetradecamethylcycloheptasiloxan 2.7
Tetradecamethylhexosiloxane (68° F.) 2.5
Tetradecanol (100° F.) 4.7
Tetraethyl Amylenetetracarboxylate 4.40
Tetraethyl Hexane-1-Phenyl Tetracarboxylate (66° F.) 5.9
Tetraethyl Pentane Diphenyl Tetracarboxylate (68° F.) 2.7
Tetraethyl Propane Tetracarboxylate (66° F.) 5.2
Tetraethyl Propylene Tetracarboxylate (66° F.) 6.0
Tetraethyl Silicate (68° F.) 4.1
Tetrafluoroethylene 2.0
Tetrahydro-B-Napthol (68° F.) 11.0
Tetranitromethane (68° F.) 2.2
Tetratriacontadiene (76° F.) 2.8
Thallium Chloride 46.9
Thinner 3.7
Thioacetic Acid (68° F.) 13.0
Thionyl Bromide (68° F.) 9.1
Thionyl Chloride (68° F.) 9.3
Thiophene (60° F.) 2.8
Thiophiosphoryl Chloride (70° F.) 5.8
Thorium Oxide 10.6
Thrichloroethylene (61° F.) 3.4
Thujone (32° F.) 10.0
Tide (Loose From Box) 1.6
Tin Tetrachloride (68° F.) 2.9
Titanium Tetrachloride (68° F.) 2.8
Titanium Dioxide 110.00
Titanium Oxide 40-50

TABLE 1-continued

(Dielectric Materials)

Titanium Tetrachloride (68 Degrees F.) 2.8
Tobacco 1.6-1.7
Tobacco Dust (6% Moisture) 1.7
Toluene (68° F.) 2.4
Toluene, Liquid 2.0-2.4
Toluidine (68° F.) 6.0
Tolunitrile (73° F.) 18.8
Tolyl Methyl Ether (68° F.) 3.5
Totane (111° F.) 5.5
Tourmaline 6.3
Trans-3-Hexene (76° F.) 2.0
Transmission Oil (80° F.) 2.2
Tribromopropane (68° F.) 6.4
Tributylphosphate (86° F.) 8.0
Trichlorethylene 3.4
Trichloroacetic Acid (140° F.) 4.6
Trichloroethane 7.5
Trichloroethylene (61° F.) 3.4
Trichlorololuene (70° F.) 6.9
Trichloropropane (76° F.) 2.4
Trichlorotoluene (69° F.) 6.9
Trichloroxoluene 6.9
Tricosanone(176° F.) 4.0
Tricresyl Phosphate (104° F.) 6.9
Triethyl Aconitate (68° F.) 6.4
Triethyl Aluminum (68° F.) 2.9
Triethyl Ethanetricarboxylate (66° F.) 6.5
Triethyl Isoaconitate (68° F.) 7.2
Triethylamine (21° F.) 3.2
Triethylamine (77° F.) 2.4
Trifluoroactic Acid (68° F.) 39.0
Trifluorotoluene (86° F.) 9.2
Trimethyl Borate (68° F.) 8.2
Trimethyl-3-Heptene (68° F.) 2.2
Trimethylamine (77° F.) 2.5
Trimethylbenzene (68° F.) 2.3
Trimethylbutane (68° F.) 1.9
Trimethylpentane 1.9
Trimethylpentane (68° F.) 2.9
Trimethylsulfanilic Acid (64° F.) 89.0
Trinitrobenzene (68° F.) 2.2
Trinitrotoluene (69° F.) 22.0
Triolein (76° F.) 3.2
Triphenylmethane (212° F.) 2.3
Tripolmitin (140° F.) 2.9
Tristearin (158° F.) 2.8
Turpentine (Wood) (68° F.) 2.2
Two-Dichloroethane 10.7
Return to top
U Undecane (68° F.) 2.0
Undecanone (58° F.) 8.4
Urea 5-8
Urea (71° F.) 3.5
Urea Formaldehyde (_f Degrees F.)
Urea Formaldehyde (Cellulose Filler) 6.4-6.9
Urea Resin 6.2-9.5
Urethan (121° F.) 14.2
Urethane (74° F.) 3.2
Urethane Resin 6.5-7.1
Return to top
V Valeraldehyde (58° F.) 11.8
Valerie Acid (68° F.) 2.6
Valeronitrile (70° F.) 17.7
Vanadium Oxybromide (78° F.) 3.6
Vanadium Oxychloride (78° F.) 3.4
Vanadium Sulfide 3.1
Vanadium Tetrachloride (78° F.) 3.0
Vaseline 2.2-2.9
Veratrol (73° F.) 4.5
Vinyl Alcohol Resin 2.6-3.5
Vinyl Butyral 3.3-3.9
Vinyl Chloride (Acetate) 3.0-3.1
Vinyl Chloride (Flexible) 3.5-4.5
Vinyl Chloride (Ridgig) 2.8-3.0

Vinyl Chloride Resin, Hard 5.8-6.4
Vinyl Chloride Resin, Soft 2.8-4.0
Vinyl Ether (68° F.) 3.9
Vinyl Formal 3.0
Vinyllidene Chloride 3.0-4.0
Vycor Glass 3.8
Return to top
W Water 4-88
Water (32° F.) 88.0
Water (68° F.) 80.4
Water (212° F.) 55.3
Water (390° F.) 34.5
Water (80° F.) 80.0
Water (Steam) 1.00785
Wax 2.4-6.5
Wheat Flour 3.0-5.0
Wheat Flour (Dry Powder) 1.6
White Mica 4.5-9.6
Wood, Dry 2-6
Wood, Pressed Board 2.0-2.6
Wood, Wet 10-30
Return to top
X Xylene (68° F.) 2.4
Xylene, Liquid 2.2-2.6
Xylenol 17
Xylenol (62° F.) 3.9
Xylidine (68° F.) 5.0
Return to top
Y
Z Zinc Oxide 1.7-2.5
Zinc Sulfide 8.2
Zircon 12.0
Zirconium Oxide 12.5
Zirconium Silicate 5.0
Return to top
Numeric 1,2-Dichloroethane (77° F.) 10.7
1-Diethoxyethane (75° F.) 3.8
1-Heptene (68° F.) 2.1
1-Octanol (68° F.) 10.3
2-Methyl-Propanol (77° F.) 17.7
3 Dimethyl-2-Butanone 13.1
3-Chloro-1, Dihydroxyprone (68° F.) 31.0
3-Dimethyl-2-Butanone (293° F.) 13.1

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

I claim:

1. A mobile device for wireless communications comprising:
   a transmitter and an antenna;
   a face plate, said face plate oriented towards a user during use; said face plate further comprising a viewing screen and a plurality of user input keys;
   a back plate disposed opposite from said face plate;
   said antenna located proximate to a portion of the back plate; and
   a dielectric material disposed on said face plate shielding the user from radio waves broadcast from the antenna during communications, wherein the portion of the back plate is not shielded; wherein said dielectric material is disposed as a layer over a second material forming said plurality of user input keys, wherein an interface between the layer of dielectric material and the second material is convex with respect to the second material.

2. A mobile device for wireless communications comprising:
- a transmitter and an antenna;
- a face plate, said face plate oriented towards a user during use; said face plate further comprising a viewing screen and a plurality of user input keys;
- a back plate disposed opposite from said face plate;
- said antenna located proximate to a portion of the back plate; and
- a dielectric material disposed on said face plate shielding the user from radio waves broadcast from the antenna during communications, wherein the portion of the back plate is not shielded; wherein said dielectric material is disposed as a layer over a second material forming said plurality of user input keys, wherein an interface between the layer of dielectric material and the second material is concave with respect to the second material.

* * * * *